United States Patent
Yang

(10) Patent No.: US 10,880,240 B2
(45) Date of Patent: Dec. 29, 2020

(54) MESSAGE TRANSMISSION METHOD AND DEVICE, TERMINAL AND STORAGE MEDIUM

(71) Applicant: GUANGDONG OPPO MOBILE TELECOMMUNICATIONS CORP., LTD., Guangdong (CN)

(72) Inventor: Xin Yang, Dongguan (CN)

(73) Assignee: Guangdong OPPO Mobile Telecommunications Corp., Ltd., Guangdong (CN)

( * ) Notice: Subject to any disclaimer, the term of this patent is extended or adjusted under 35 U.S.C. 154(b) by 0 days.

(21) Appl. No.: 16/575,597

(22) Filed: Sep. 19, 2019

(65) Prior Publication Data

US 2020/0092234 A1    Mar. 19, 2020

(30) Foreign Application Priority Data

Sep. 19, 2018  (CN) .......................... 2018 1 1093004

(51) Int. Cl.
*H04L 12/58*    (2006.01)
*H04W 4/80*    (2018.01)
(Continued)

(52) U.S. Cl.
CPC .............. *H04L 51/04* (2013.01); *H04L 12/28* (2013.01); *H04L 67/306* (2013.01); *H04W 4/80* (2018.02)

(58) Field of Classification Search
CPC ....... H04L 51/04; H04L 12/28; H04L 67/306; H04L 51/38; H04W 4/80; H04W 88/06
See application file for complete search history.

(56) References Cited

U.S. PATENT DOCUMENTS

D835,151 S       12/2018  Martin et al.
2010/0217809 A1*  8/2010  Vymenets .............. G06Q 10/10
                                                    709/206
(Continued)

FOREIGN PATENT DOCUMENTS

CN       102647368 A      8/2012
CN       105227782 A      1/2016
(Continued)

OTHER PUBLICATIONS

Supplementary European Search Report in the European application No. 19198419.4, dated Dec. 9, 2019.
(Continued)

*Primary Examiner* — Caroline H Jahnige

(57) ABSTRACT

Provided are a message transmission method and device, a terminal and a storage medium, belonging to the technical field of communications. The method includes: sending an instant messaging message to a second terminal, the instant messaging message being a message input in first chat interface; when a transmission mode switching condition is satisfied, switching the first chat interface to a second chat interface, the second chat interface being used for displaying an LPWAN communication record between the first terminal and the second terminal; acquiring a first LPWAN communication message input in the second chat interface; and sending the first LPWAN communication message to the second terminal through a connection with the second terminal for display of the first LPWAN communication message in the second chat interface of the local terminal. The second chat interface adopts a public or private wireless protocol.

14 Claims, 7 Drawing Sheets

(51) Int. Cl.
*H04L 12/28* (2006.01)
*H04L 29/08* (2006.01)

(56) References Cited

U.S. PATENT DOCUMENTS

| | | | |
|---|---|---|---|
| 2015/0350855 A1* | 12/2015 | Huang | H04L 51/04 455/426.1 |
| 2016/0088455 A1 | 3/2016 | Bozik et al. | |
| 2017/0070919 A1* | 3/2017 | Verger | H04W 76/23 |
| 2017/0164175 A1 | 6/2017 | Bozik et al. | |
| 2019/0174288 A1 | 6/2019 | Bozik et al. | |

FOREIGN PATENT DOCUMENTS

| | | | |
|---|---|---|---|
| CN | 106102103 A | 11/2016 |
| CN | 106791567 A | 5/2017 |
| CN | 107079365 A | 8/2017 |
| CN | 107820237 A | 3/2018 |
| CN | 109257729 A | 1/2019 |
| EP | 2963839 A1 | 1/2016 |
| EP | 3021530 A1 | 5/2016 |

OTHER PUBLICATIONS

International Search Report in the international application No. PCT/CN2019/106765, dated Dec. 20, 2019.
Written Opinion of the International Search Authority in the international application No. PCT/CN2019/106765, dated Dec. 20, 2019.

* cited by examiner

MESSAGE TRANSMISSION METHOD AND DEVICE, TERMINAL AND STORAGE MEDIUM

CROSS-REFERENCE TO RELATED APPLICATION

This application claims priority to Chinese Patent Application No. 201811093004.3, filed on Sep. 19, 2018, the disclosure of which is hereby incorporated by reference in its entirety.

TECHNICAL FIELD

The disclosure relates to the technical field of communications, and more particular to a message transmission method and device, a terminal and a storage medium.

BACKGROUND

With the development of Internet technology, more and more instant messaging applications have emerged.

After a user installs an instant messaging application in a terminal, the user may adopt the instant messaging application to communicate with other users by registering an instant messaging account and adding instant messaging accounts of other users. The terminal sends an instant messaging message to an instant messaging server through a mobile data network or a Wireless-Fidelity (Wi-Fi) network, and the instant messaging server sends the instant messaging message to a terminal of an opposite user through the mobile data network or the Wi-Fi network.

BRIEF DESCRIPTION OF DRAWINGS

The aspects and advantages of the disclosure will become apparent and readily understood from the descriptions of the embodiments in combination with the accompanying drawings.

DETAILED DESCRIPTION

Figure 1:
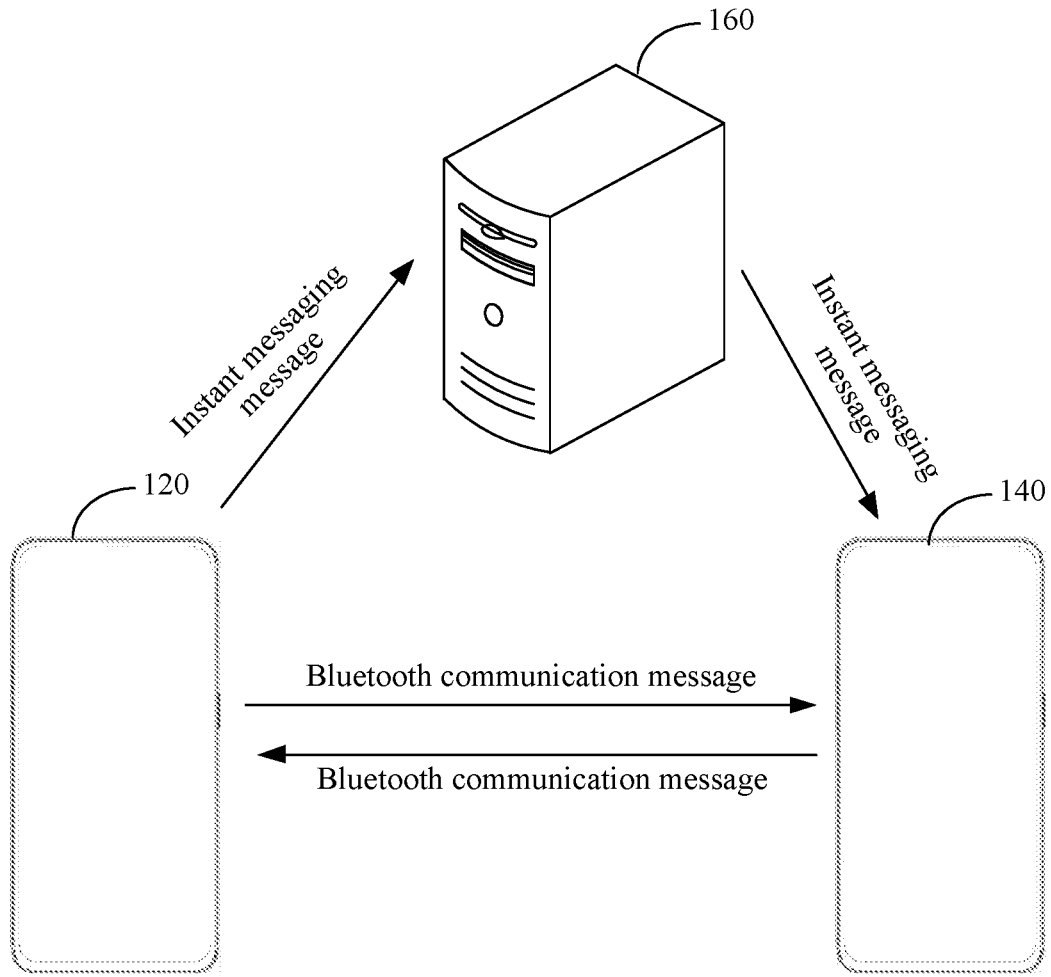
FIG. 1 illustrates a schematic diagram of an implementation environment according to an embodiment of the disclosure.

In order to make the objectives, technical solutions and advantages of the disclosure clearer, the implementation manners of the disclosure will be further described in detail in combination with the drawings.

The term "multiple" used in the disclosure indicates two or more. The term "and/or" is an association relationship describing associated objects and represents that three relationships may exist. For example, A and/or B may represent three conditions: i.e., independent existence of A, existence of both A and B and independent existence of B. The character "/" usually represents that previous and next associated objects form an "or" relationship.

The disclosure provides a message transmission method and device, a terminal and a storage medium, which is capable of solving the problem in a related art that message transmission cannot be performed by an instant communication application when the state of a mobile data network or a Wi-Fi network is poor. The technical solutions are as follows.

According to an aspect, a message transmission method is provided. The method may be applied to a first terminal and may include the following operations.

An instant messaging message is sent to a second terminal. The instant messaging message is a message input in a first chat interface, and the first chat interface is an interface of an instant messaging application that is being run in the first terminal and the second terminal.

Responsive to determining that a transmission mode switching condition is satisfied, the first chat interface is switched to a second chat interface. The second chat interface is used for displaying a Low-Power Wide-Area Network (LPWAN) communication record between the first terminal and the second terminal.

A first LPWAN communication message input in the second chat interface is acquired.

The first LPWAN communication message is sent to the second terminal through a connection with the second terminal. The second terminal is used for displaying the first LPWAN communication message in the second chat interface of the local terminal.

According to another aspect, a message transmission device is provided. The device may be applied to a first terminal. The device may include a first sending module, a first switching module, a first acquisition module and a second sending module.

The first sending module is configured to send an instant messaging message to a second terminal. The instant messaging message is a message input in a first chat interface, and the first chat interface is an interface of an instant messaging application that is being run in the first terminal and the second terminal.

The first switching module is configured to switch, responsive to determining that a transmission mode switching condition is satisfied, the first chat interface to a second chat interface. The second chat interface is used for displaying an LPWAN communication record between the first terminal and the second terminal.

The first acquisition module is configured to acquire a first LPWAN communication message input in the second chat interface.

The second sending module is configured to send the first LPWAN communication message to the second terminal through a connection with the second terminal. The second terminal is used for displaying the first LPWAN communication message in the second chat interface of the local terminal.

According to another aspect, a terminal is provided. The terminal may include a processor and a memory. The memory may store at least one instruction that is executed by the processor to implement the message transmission method as described in the above aspect.

According to another aspect, a computer-readable storage medium is provided. The storage medium may store at least one instruction that is executed by a processor to implement the message transmission method as described in the above aspect.

During message transmission between terminals through an instant messaging application, when a transmission mode switching condition is satisfied, the terminal switches an instant messaging application interface (i.e., a first chat interface) to a second chat interface, and transmits an LPWAN communication message input in the second chat interface of the local terminal to the opposite terminal through a wireless connection established between the terminals, thereby implementing message transmission between the terminals. With the message transmission method according to the embodiment of the disclosure, when a network state is poor, the terminals can switch to use LPWAN technologies for message transmission, thereby avoiding the problem that communication cannot be performed when the network state is poor, and expanding an application scenario of communications between the terminals. The LPWAN technologies may include public or private wireless protocol technologies, which include, but not limited to, Bluetooth, Long Range Radio (LoRa), SigFox, Weightless, Random Phase Multiple Access (RPMA), Qowisio, N-Wave, Telensa, DART (Directional Antenna based RouTing) or the like.

Referring to FIG. 1, FIG. 1 illustrates a schematic diagram of an implementation environment according to an embodiment of the disclosure. The implementation environment includes a first terminal 120, a second terminal 140 and a server 160.

The first terminal 120 and the second terminal 140 may be Bluetooth-enabled electronic devices, and may also be electronic devices adopting other LPWAN technologies, such as LoRa or the like. The electronic devices may be smart phones, tablet computers, wearable devices, or portable personal computers. In FIG. 1, as an example for description, the first terminal 120 and the second terminal 140 are both smart phones. In the embodiment of the disclosure, the first terminal 120 and the second terminal 140 support the same LPWAN protocol.

After the terminal enables an LPWAN function, a signal broadcast by each surrounding device may be received and displayed in a list.

In the embodiment of the disclosure, the first terminal 120 and the second terminal 140 further have an LPWAN chat function, such as a Bluetooth or LoRa chat function. The LPWAN chat function may be a system tool provided by a terminal system, or may be implemented as an application separately. For example, by means of the Bluetooth chat function, message transmission may be performed between the first terminal 120 and the second terminal 140 via a Bluetooth connection. Likewise, by means of the LoRa chat function, message transmission may be performed between the first terminal 120 and the second terminal 140 via a LoRa connection.

In the embodiment of the disclosure, an instant messaging application (IM APP) is also installed in the first terminal 120 and the second terminal 140. In a network connection state (the mobile data network or Wi-Fi network), the first terminal 120 and the second terminal 140 may perform message transmission through the instant messaging application. Further, the first terminal 120 and the second terminal 140 support switching between an instant messaging function and the LPWAN chat function, that is, the first terminal 120 and the second terminal 140 may switch to the LPWAN chat function for chatting when chatting through the instant messaging application, or may switch to the instant messaging application for chatting when chatting through LPWAN.

The server 160 is a background server corresponding to the instant messaging application, which may be one server, a server cluster including a plurality of servers, or a cloud computing center. The instant messaging message from the terminal is transmitted to the server 160 over a network, and then transmitted by the server 160 to an opposite terminal over the network.

In a possible application scenario, as illustrated in FIG. 1, the first terminal 120 transmits an instant messaging message to the server 160 through the network, and the server 160 transmits the instant messaging message to the second terminal 140 through the network to implement instant message transmission. When the network state is poor to cause transmission failure of the instant messaging message, the first terminal 120 establishes an LPWAN connection with the second terminal 140, and transmits a communication message through the LPWAN connection.

The embodiments of the disclosure are described by taking the message transmission method applied to the first terminal 120 in FIG. 1 as an example.

Figure 2:
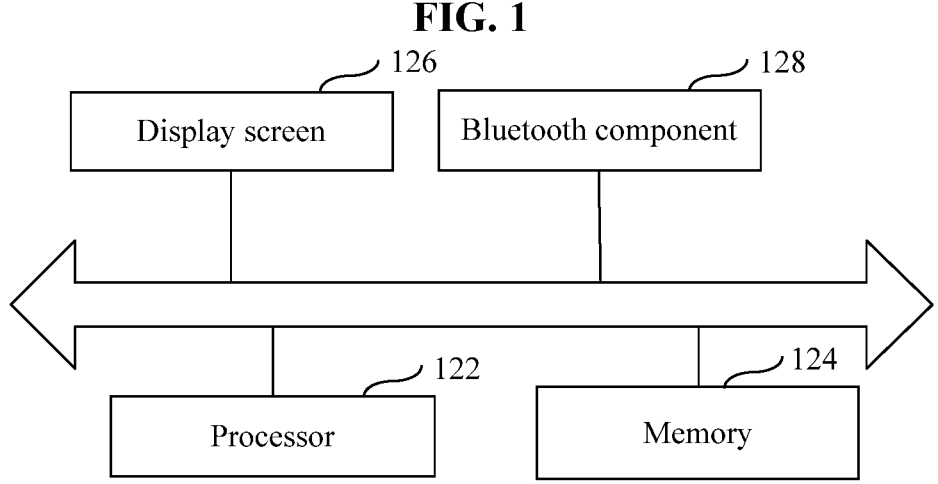
FIG. 2 illustrates a schematic structure diagram of a terminal according to an exemplary embodiment of the disclosure.

Referring to FIG. 2, FIG. 2 illustrates a schematic structure diagram of a terminal according to an exemplary embodiment of the disclosure. The terminal may be implemented as the first terminal 120 or the second terminal 140 in FIG. 1.

In at least one embodiment, the terminal 120 includes a processor 122, a memory 124, a display screen 126 and a wireless component 128.

The processor 122 may include one or more processing cores. The processor 122 connects each part in the whole terminal by virtue of various interfaces and lines, and executes various functions and data processing of the terminal 120 by running or executing an instruction, program, code, code set or instruction set stored in the memory 124 and calling data stored in the memory 124. In at least one example, the processor 122 may be implemented in at least one hardware form of Digital Signal Processing (DSP), a Field-Programmable Gate Array (FPGA) or a Programmable Logic Array (PLA). The processor 122 may integrate one or combination of more of a Central Processing Unit (CPU), a Graphics Processing Unit (GPU), a modem and the like. The CPU is mainly configured to process an operating system, a user interface, an application and the like. The GPU is configured to render and draw a content to be displayed on the display screen. The modem is configured to process wireless communication. It can be understood that the modem may also not be integrated into the processor 122 but be independently implemented by a chip.

The memory 124 may include a Random Access Memory (RAM) and may also include a Read-Only Memory (ROM). In at least one embodiment, the memory 124 includes a non-transitory computer-readable storage medium. The memory 124 may be configured to store the instruction, the program, the code, the code set or the instruction set. The memory 124 may include a program storage region and a data storage region. The program storage region may store an instruction configured to implement the operating system, an instruction configured for at least one function (for example, a touch function, a sound playing function and an image playing function), an instruction configured to implement each of the following method embodiments and the like. The data storage region may store data involved in each of the following method embodiments.

The display screen 126 is a component for displaying images. The display screen 126 may have only an image display function, or may have both an image display function and a function of receiving a touch operation, that is, the display screen 126 may be a touch display screen. Moreover, the display screen 126 may be a full screen, an irregularly-shaped screen, a folding screen, a curved screen or other forms of screens, which is not limited in the embodiments of the disclosure.

The wireless component 128 is a component for implementing the LPWAN function, such as the Bluetooth function, the LoRa function or the like. Taking a Bluetooth component serving as the wireless component 128 for example, the Bluetooth component 128 includes a transceiver, a Power Amplifier (PA), a Low Noise Amplifier (LNA), and an antenna.

Figure 3:
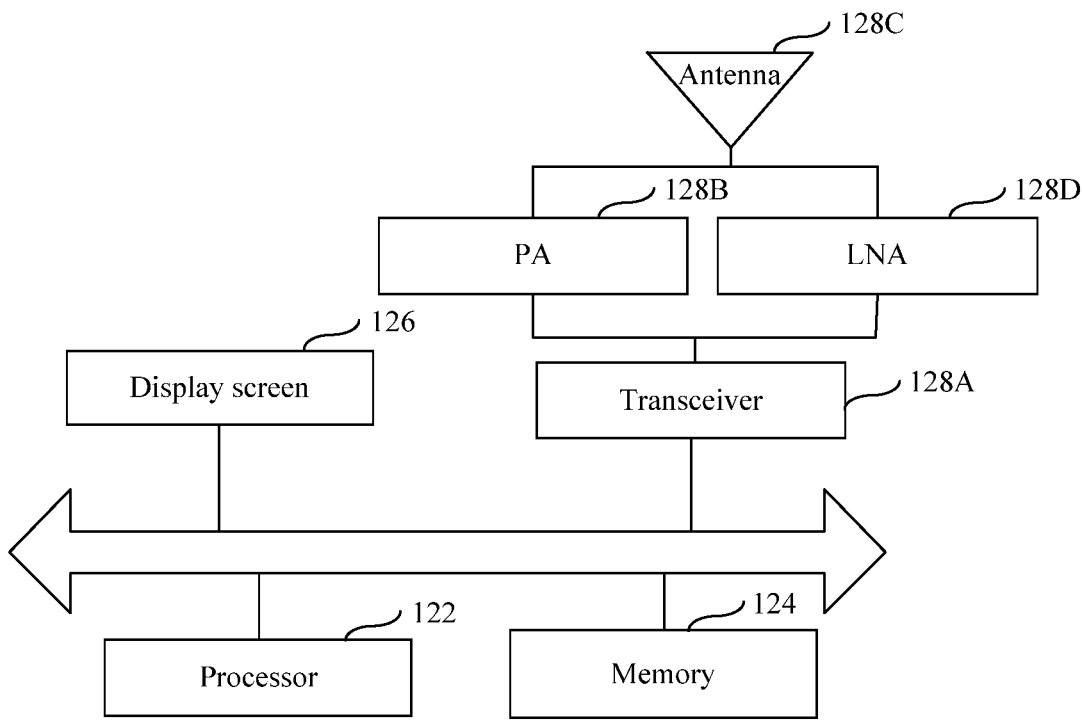
FIG. 3 illustrates a schematic structure diagram of a terminal according to another exemplary embodiment of the disclosure.

Schematically, as illustrated in FIG. 3, when a Bluetooth signal is transmitted, after the processor 122 sends information to be transmitted to a transceiver 128A, the transceiver 128A loads the information into the Bluetooth signal at a predetermined frequency band according to a Bluetooth protocol specification. The Bluetooth signal is amplified by the PA 128B and then transmitted through the antenna 128C. When receiving the Bluetooth signal, after the Bluetooth signal is received through the antenna 128C, the received Bluetooth signal is de-noised by the LNA 128D, and the de-noised Bluetooth signal is transmitted back to the transceiver 128A, so that the transceiver 128A transmits the information demodulated from the Bluetooth signal back to the processor 122.

In a possible implementation manner, the Bluetooth component 128 in the first terminal 120 supports a long range mode. In the long range mode, Bluetooth signal transmission is performed at a physical layer using a data rate of 125 kbps. The data rate of 125 kbps is one eighth of a standard low-power Bluetooth data rate of 1 Mbps, but the signal receiving sensitivity is improved by 6 dB, thereby achieving longer-range Bluetooth signal transmission. The message transmission method provided by the embodiments of the disclosure may be based on a long range mode of Bluetooth 5.0.

The terminal may further include other components such as a range sensor, a camera, an acceleration sensor, an angular velocity sensor, a positioning module, an infrared module and the like. The embodiments of the disclosure do not limit the specific structure of the terminal.

In the related art, when message transmission is performed between terminals through an instant messaging application, the network quality directly affects the transmission quality of the instant messaging message due to the fact that message transmission between a terminal and a server is required to be performed through the network. In a scenario of the poor network state, such as a mountainous area that is not covered by a mobile data network, a parking lot, or a high-terminal-density place, the effect of instant messaging is poor.

Moreover, since the instant messaging message is required to be transmitted through the server and the server will store the received instant messaging message, privacy information of the user may be leaked.

In the message transmission method provided by the embodiments of the disclosure, during the message transmission between the terminals through the instant messaging application, LPWAN can be switched for chatting, thereby implementing message transmission through the connection between the terminals. Since the LPWAN connection is a point-to-point connection and does not require a mobile data network or a Wi-Fi network, message transmission can be performed even in a scenario with a poor network state. Further, the communication message transmitted through the LPWAN connection does not pass through the server, so as to avoid the privacy leak due to the case that the server retains communication messages. The following description is made using the illustrative embodiments.

Figure 4:
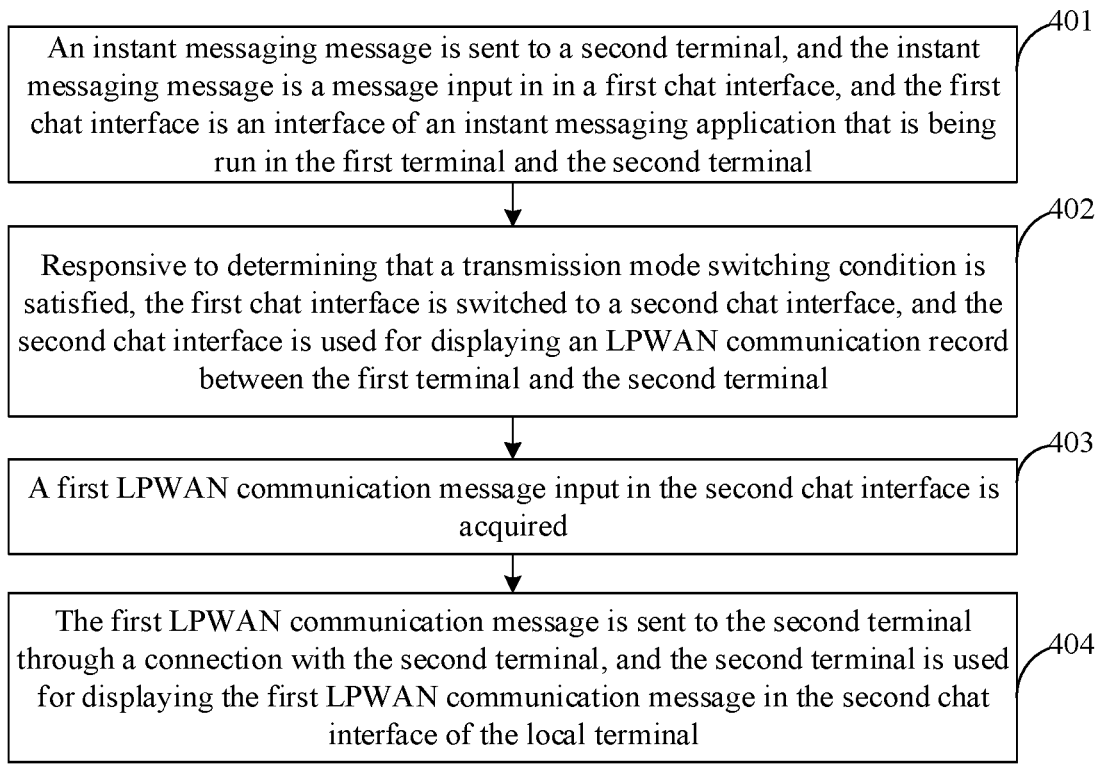
FIG. 4 illustrates a flowchart of a message transmission method according to an exemplary embodiment of the disclosure.

Referring to FIG. 4, FIG. 4 illustrates a flowchart of a message transmission method according to an exemplary embodiment of the disclosure. The present embodiment is exemplified by applying the method to the first terminal 120 illustrated in FIG. 1. The method includes the following operations in blocks 401-404.

In 401, an instant messaging message is sent to a second terminal, and the instant messaging message is a message input, in a first chat interface, and the first chat interface is an interface of an instant messaging application that is being run in the first terminal and the second terminal.

The first chat interface may refer to an instant messaging application interface. When the instant messaging application is running, the first terminal displays an instant messaging application interface, and acquires an instant messaging message input in a message sending control. The message sending control may be a message input box, and the instant messaging message may be a text, an emoticon, a picture, an animation, a video, a file or the like.

The instant messaging message sent by the first terminal is transmitted to the server through a data network (the mobile data network or Wi-Fi network). The server sends the instant messaging message to the second terminal through the data network according to a receiver identifier (i.e., an identifier of the second terminal) of the instant messaging message.

In 402, responsive to determining that a transmission mode switching condition is satisfied, the first chat interface is switched to a second chat interface, and the second chat interface is used for displaying an LPWAN communication record between the first terminal and the second terminal.

The second chat interface adopts the LPWAN technology, such as Bluetooth, LoRa, SigFox, Weightless, RPMA, Qowisio, N-Wave, Telensa, DART or other public or private wireless protocol technology. When the Bluetooth technology is used, the second chat interface may be a Bluetooth chat interface, and when the LoRa technology is used, the second chat interface may be a LoRa chat interface. The embodiments of the disclosure do not limit the type of the second chat interface.

The transmission mode switching condition may be automatically triggered by a terminal, or may be manually triggered by a user. Taking the Bluetooth protocol as an example, since message transmission based on a Bluetooth connection is required to achieve the Bluetooth chat function, the transmission mode switching condition includes at least: the second terminal is within a Bluetooth connection range of the first terminal.

When the transmission mode switching condition is satisfied, the first terminal switches the instant messaging application to a background running state, and runs the Bluetooth chat function (which may be implemented as a Bluetooth chat tool or application) or the LoRa chat function (which may be implemented as a LoRa chat tool or application) in the foreground, thereby implementing interface switching.

It is to be noted that when the first terminal switches an instant messaging application interface (i.e., the first chat interface) to a second chat interface, the second terminal also switches the instant messaging application interface displayed on the second terminal to the second chat interface, so as to display the received communication message in the second chat interface of the second terminal.

In at least one embodiment, when the transmission mode switching condition is satisfied, a connection is established between the first terminal and the second terminal.

Figure 5:
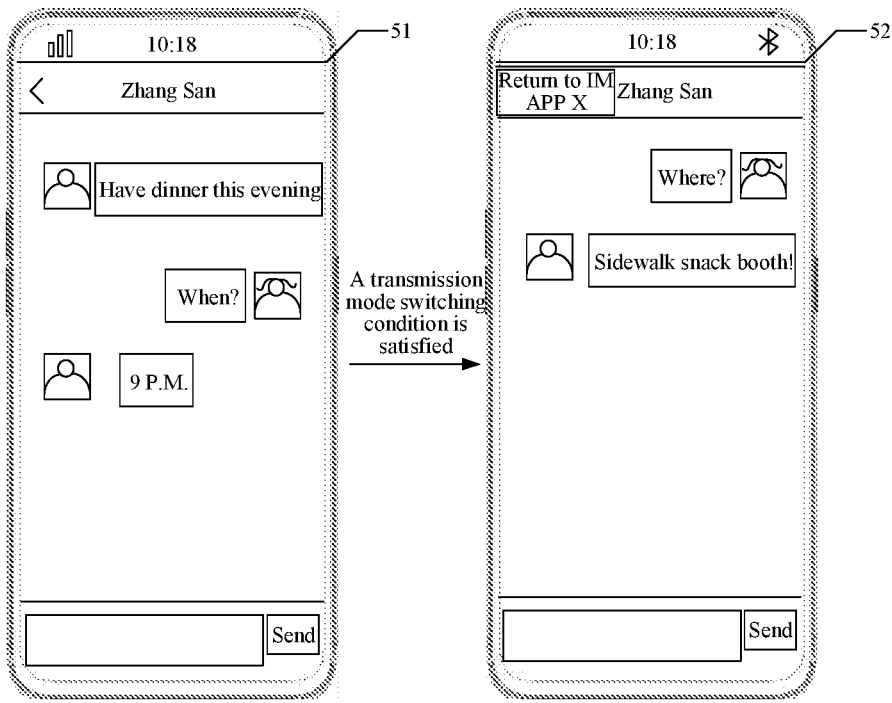
FIG. 5 is a schematic interface diagram of an implementation process of the message transmission method in FIG. 4.

Schematically, as illustrated in FIG. 5, the first terminal displays an instant messaging application interface 51 when communicating through an instant messaging application. When the transmission mode switching condition is satisfied, the terminal switches the instant messaging application interface 51 to a Bluetooth chat interface 52.

Figure 6:
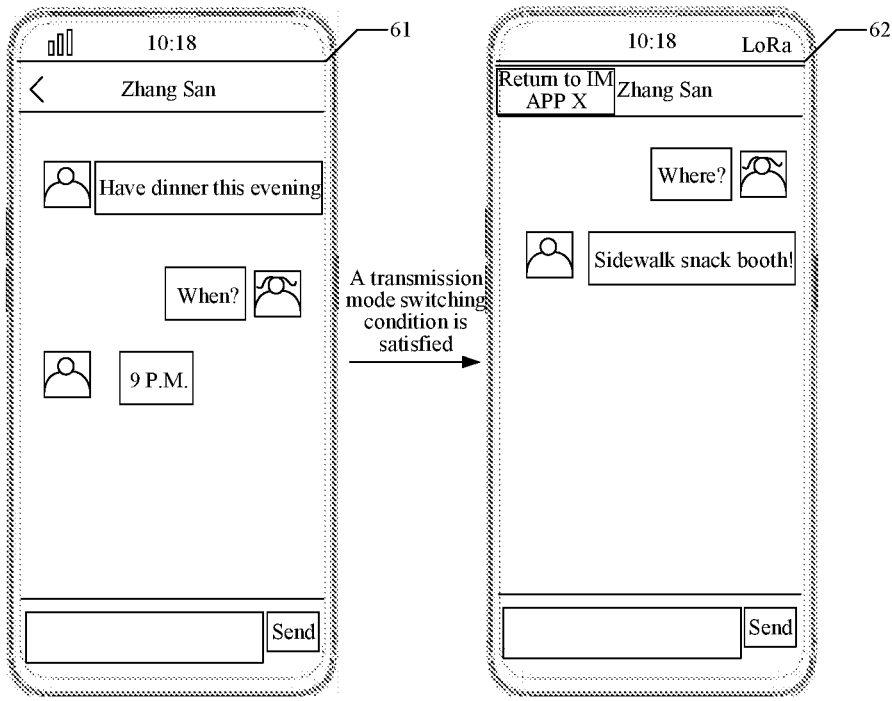
FIG. 6 is another schematic interface diagram of an implementation process of the message transmission method in FIG. 4.

As illustrated in FIG. 6, the first terminal displays an instant messaging application interface 61 when communicating through an instant messaging application. When the transmission mode switching condition is satisfied, the terminal switches the instant messaging application interface 61 to a LoRa chat interface 62.

In 403, a first LPWAN communication message input in the second chat interface is acquired.

In at least one embodiment, the second chat interface includes a message sending control, and the terminal acquires the first LPWAN communication message input in the message sending control. For example, the message sending control may be a text input box. The embodiments of the disclosure do not limit the manner of acquiring the first LPWAN communication message.

The first LPWAN communication message may be a text, an emoticon, a picture, an animation, a video, a file or the like.

In 404, the first LPWAN communication message is sent to the second terminal through a connection with the second terminal, and the second terminal is used for displaying the first LPWAN communication message in the second chat interface of the local terminal.

Further, the first terminal sends the first LPWAN communication message to the second terminal through a pre-established wireless connection (for example, a Bluetooth connection or LoRa connection). After receiving the first LPWAN communication message, the second terminal displays the first LPWAN communication message in the second chat interface of the local terminal (i.e., the second terminal).

In at least one embodiment, in order to enable a message receiver to be aware of a sender of the LPWAN communication message, the second communication interface further displays account information of an instant messaging account corresponding to a terminal of the message sender. The account information may include at least one of an account picture, an account name or an account note.

Correspondingly, the second terminal may also send a second LPWAN communication message input in the second chat interface of the second terminal to the first terminal through the connection, for the first terminal to display.

In at least one embodiment, for the received LPWAN communication message, the (first or second) terminal stores the LPWAN communication message locally, without uploading the LPWAN communication message to the server, thereby preventing personal privacy information from being leaked.

In the present embodiments, during the message transmission between terminals through an instant messaging application, when the transmission mode switching condition is satisfied, the terminal switches the instant messaging application interface (i.e., the first chat interface) to the second chat interface and transmits a communication message input in the second chat interface of the local terminal to the opposite terminal through a connection established between the terminals, thereby implementing the message transmission between the terminals. With the message transmission method according to the embodiment of the disclosure, when a network state is poor, the terminals can switch to use LPWAN protocols for message transmission, thereby avoiding the problem that communication cannot be performed in case of the poor network state, and expanding an application scenario of communications between the terminals.

In the condition that the Bluetooth protocol is used, in order to realize switching between instant messaging and Bluetooth communication, the first terminal and the second terminal are required to perform Bluetooth pairing in advance, and after the first pairing is completed, the first terminal and the second terminal can automatically establish a Bluetooth connection and implement Bluetooth communication. The following description is made using the illustrative embodiments.

Referring to FIG. 6, FIG. 6 illustrates a flowchart of a message transmission method according to another exemplary embodiment of the disclosure. The present embodiment is exemplified by applying the method to the first terminal 120 illustrated in FIG. 1. The method includes the following operations in blocks 601-610.

In 601, Bluetooth pairing with a second terminal is performed, and target Bluetooth information of the second terminal is added into a Bluetooth pairing list after pairing.

In a possible implementation manner, when the first terminal and the second terminal both enable the Bluetooth function and are within a Bluetooth connection range, the first terminal performs Bluetooth pairing with the second terminal. A legacy pairing or secure connections pairing method may be used for the terminal to perform the Bluetooth pairing, which is not limited in the disclosure.

After the Bluetooth pairing is completed, the first terminal and the second terminal are paired terminals. Bluetooth information of an opposite end is added to a Bluetooth pairing list of a local terminal. For example, the Bluetooth information of the second terminal is added into the Bluetooth pairing list of the first terminal. The Bluetooth information includes at least a Bluetooth address (unique identifier). In addition, the Bluetooth information may include a Bluetooth name and the like, which is not limited in the disclosure.

In at least one embodiment, in order to ensure the security of subsequent Bluetooth connection establishment, a Bluetooth connection key between the terminals is agreed during Bluetooth pairing. The Bluetooth connection key is stored in the Bluetooth pairing table (associatively stored with Bluetooth information), and then a subsequent Bluetooth connection is established according to the Bluetooth connection key.

It is to be noted that the same terminal may perform Bluetooth pairing with multiple terminals, thereby implementing Bluetooth communication with the multiple terminals. The disclosure does not limit the number of Bluetooth-paired terminals.

In 602, target account information of an instant messaging account corresponding to the second terminal is acquired.

In at least one embodiment, in order to switch between an instant messaging application and a Bluetooth chat tool, the Bluetooth chat tool is required to be matched with the instant messaging application in advance. The Bluetooth chat tool may be matched with multiple instant messaging applications.

After the instant messaging application is matched with the Bluetooth chat tool, the Bluetooth chat tool has the right to acquire specified information in the instant messaging application. In a possible implementation manner, the Bluetooth chat tool acquires target account information of an instant messaging information account corresponding to the paired second terminal. The target account information may include at least one of an account name, an account note, or an account picture.

In other possible implementation manners, the target account information may also be actively provided to the Bluetooth chat tool by the instant messaging application, which is not limited in the embodiment of the disclosure.

In 603, the target account information and the target Bluetooth information are stored in association with each other.

Further, the first terminal associatively stores the acquired target account information of the second terminal(s) and the target Bluetooth information in the Bluetooth pairing list. When the subsequent communication is performed by using the instant messaging application, the instant messaging accounts (friends) that support Bluetooth communication can be determined based on the Bluetooth pairing list.

In a possible implementation manner, the terminal simultaneously displays the Bluetooth information of the paired terminal and the account information of the instant communication account, and determines a matching relationship between the Bluetooth information and the account information according to the received selection operation, thereby associatively storing the matched Bluetooth information and target account information. The embodiment of the disclosure does not limit the matching process of account information and Bluetooth information.

Schematically, the Bluetooth pairing list is illustrated in Table 1.

TABLE 1

| Account information | Bluetooth information | Bluetooth connection key |
|---|---|---|
| Zhang San | 64:CC:2E:F4:35:C8 | 123456 |
| Li Si | 15:14:2F:B7:98:C2 | 654321 |

Through the operations in 601 to 603, the first terminal completes the Bluetooth pairing and the instant communication account association. When the first terminal subsequently communicates with the instant messaging account corresponding to the target account information in the Bluetooth pairing list, the first terminal may switch to the Bluetooth chat tool for communication.

In 604, an instant messaging message is sent to the second terminal, and the instant messaging message is a message input in an instant messaging application interface, the first terminal and the second terminal run an instant messaging application.

The implementation of this operation may make reference to the operation in 401, which will not be elaborated in the present embodiment.

In 605, target Bluetooth information of the second terminal is acquired from the Bluetooth pairing list according to the target account information of the instant messaging account corresponding to the second terminal.

The Bluetooth pairing list is the Bluetooth pairing list generated by the operations in 601 to 603, and includes a correspondence between Bluetooth information and account information of paired terminals. Likewise, a LoRa pairing list is generated by the operations in 601 to 603, and the LoRa pairing list includes a correspondence between LoRa information and account information of paired terminals.

In a possible implementation manner, when the first terminal performs instant messaging with the second terminal, it is detected whether the Bluetooth pairing list includes the target account information of the instant messaging account corresponding to the second terminal. If the Bluetooth pairing list does not include the target account information of the instant messaging account corresponding to the second terminal, it is indicated that the second terminal does not perform Bluetooth pairing with the first terminal. If the Bluetooth pairing list includes the target account information of the instant messaging account corresponding to the second terminal, it is indicated that the second terminal has performed Bluetooth pairing with the first terminal, and Bluetooth information of the second terminal is acquired according to the target account information.

In combination with the example in Table 1, when a user uses the first terminal to perform instant messaging with "Zhang San", the first terminal acquires target Bluetooth information "64:CC:2E:F4:35:C8" from the Bluetooth pairing list according to the account information "Zhang San".

In 606, responsive to determining that Bluetooth scanning information includes the target Bluetooth information, the instant messaging application interface is switched to the Bluetooth chat interface.

After acquiring the target Bluetooth information of the second terminal, the first terminal scans nearby Bluetooth devices, and detects whether the Bluetooth scan information includes the target Bluetooth information. If the Bluetooth scan information includes the target Bluetooth information, it is indicated that the second terminal is within the Bluetooth connection range of the first terminal. If the Bluetooth scan information does not include the target Bluetooth information, it is indicated that the second terminal is outside the Bluetooth connection range of the first terminal, or the second terminal does not enable the Bluetooth function.

In a possible implementation manner, when the first terminal and the second terminal both turn on an auto-switching transmission mode function, the first terminal switches the instant messaging application interface to the Bluetooth chat interface after scanning the target Bluetooth information of the second terminal. Correspondingly, the second terminal determines that the first terminal is also within the Bluetooth connection range, and switches the instant messaging application interface of the local terminal to the Bluetooth chat interface.

In at least one embodiment, since the Bluetooth transmission quality is related to the distance between the terminals, in order to ensure the quality of Bluetooth communication, when the Bluetooth signal strength of the second terminal is greater than a strength threshold, the terminal performs the transmission mode switching. When the Bluetooth signal strength of the second terminal is less than the strength threshold, the terminal does not perform transmission mode switching. For example, the strength threshold may be −100 dB.

When the mobile data network or the Wi-Fi network has a good network quality, the instant messaging application interface is automatically switched to the Bluetooth chat interface, which will affect the user experience. Therefore, in a possible implementation manner, when the Bluetooth scanning information includes target Bluetooth information and a network parameter of the mobile data network or the Wi-Fi network is less than a parameter threshold, the first terminal switches the instant messaging application interface to the Bluetooth chat interface. When the network parameter of the mobile data network or the Wi-Fi network is greater than the parameter threshold, even if the second terminal is within the Bluetooth connection range of the first terminal, the first terminal does not perform interface switching, and still communicates with the second terminal through the instant messaging application.

The parameter threshold may include at least one of the following: a network delay threshold, a network speed threshold, or a packet loss rate threshold. The present embodiment does not limit the specific type of the parameter threshold.

In addition to automatically switching interfaces by the first terminal, the first terminal may also perform interface switching according to a manual operation of a user. In a possible implementation manner, the operation includes the following actions.

1: When a switching instruction triggered by a transmission mode switching operation is received and the Bluetooth scanning information includes the target Bluetooth information, a first switching request is sent to the second terminal.

In at least one embodiment, the instant messaging application interface includes a Bluetooth chat switching control, and when receiving a trigger operation on the Bluetooth chat switching control, the first terminal determines that the switching instruction is received. There are no limits made to the triggering manner of the switching instruction in the disclosure.

After receiving the switching instruction, the first terminal detects whether the second terminal is within the Bluetooth connection range, and sends a first switching request to the second terminal when detecting that the second terminal is within the Bluetooth connection range. The first switching request is used for requesting an opposite terminal for Bluetooth communication.

The first switching request may be sent through a data network, or may be sent through a Bluetooth connection established with the second terminal, which is not limited in the disclosure.

Figure 7:
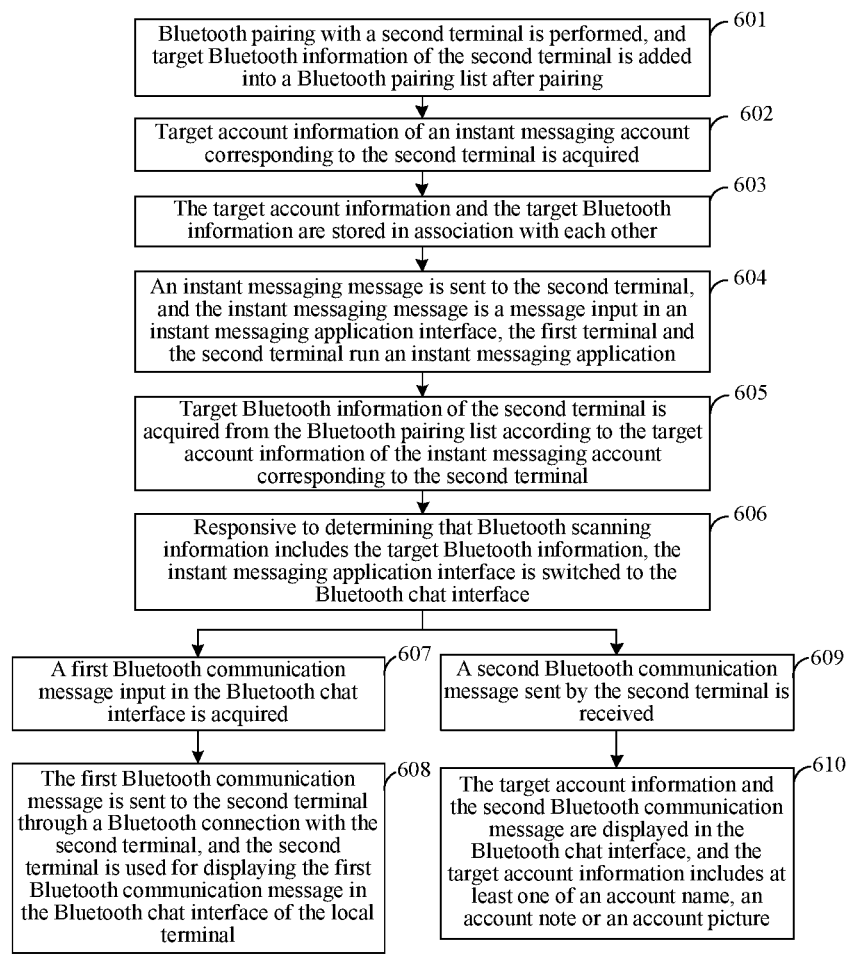
FIG. 7 illustrates a flowchart of a message transmission method according to another exemplary embodiment of the disclosure.

Schematically, as illustrated in FIG. 7, the instant messaging application interface 711 of the first terminal 71 displays a Bluetooth chat switching control 712. When the user clicks on the Bluetooth chat switching control 712, the first terminal 71 sends the first switching request to the second terminal 72.

2: When a confirmation switching feedback sent by the second terminal is received, the instant messaging application interface is switched to the Bluetooth chat interface.

In at least one embodiment, after the second terminal receives the first switching request, prompt information is displayed. When receiving a determination switching instruction, the second terminal sends the confirmation switching feedback to the first terminal. The first terminal switches the instant messaging application interface to the Bluetooth chat interface according to the received confirmation switching feedback. Correspondingly, the second terminal switches the instant messaging application interface of the local terminal to the Bluetooth chat interface.

Schematically, as illustrated in FIG. 7, the second terminal 72 displays a prompt box 721 after receiving the first switching request, and when receiving a click operation on the accept button 722, the second terminal 72 sends the confirmation switching feedback to the first terminal 71. The first terminal 71 switches to the Bluetooth chat interface 713 according to the confirmation switching feedback and display the Bluetooth chat interface 713.

In at least one embodiment, when the confirmation switching feedback sent by the second terminal is not received, the first terminal continues to display the instant messaging application interface.

In 607, a first Bluetooth communication message input in the Bluetooth chat interface is acquired.

In 608, the first Bluetooth communication message is sent to the second terminal through a Bluetooth connection with the second terminal, and the second terminal is used for displaying the first Bluetooth communication message in the Bluetooth chat interface of the local terminal.

The implementation manner of the above operations in 607 and 608 may make reference to the operations in 403 and 404, which will not be elaborated in the present embodiment.

In 609, a second Bluetooth communication message sent by the second terminal is received.

The second terminal may send the second Bluetooth communication message to the first terminal via the established Bluetooth connection. Correspondingly, the first terminal receives the second Bluetooth communication message sent by the second terminal.

In 610, the target account information and the second Bluetooth communication message are displayed in the Bluetooth chat interface, and the target account information includes at least one of an account name, an account note or an account picture.

When the first terminal displays the second Bluetooth communication message sent by the second terminal, in order to make the user intuitively understand the sender of the message, the first terminal displays the target account information corresponding to the second terminal on the peripheral side of the second Bluetooth communication message while displaying the second Bluetooth communication message in the Bluetooth chat interface, thereby simulating a chat interface similar to the instant messaging interface.

Correspondingly, after receiving the first Bluetooth communication message sent by the first terminal, the second terminal displays the account information corresponding to the first terminal and the first Bluetooth communication message in the Bluetooth chat interface of the local terminal.

Schematically, as illustrated in FIG. 7, the first terminal 71 displays an account name "Zhang San" of the instant messaging account corresponding to the second terminal 72 in the Bluetooth chat interface 713, and displays an account picture 715 next to the second communication message 714.

In the present embodiment, the first terminal performs Bluetooth pairing with the second terminal in advance, and acquires the target account information of the instant messaging account corresponding to the second terminal, so as to associatively store the target Bluetooth information and the target account information of the second terminal in a Bluetooth pairing table. In the subsequent transmission mode switching, the first terminal establishes a Bluetooth connection with the second terminal based on the Bluetooth pairing table, and displays the account information corresponding to the second terminal in the Bluetooth chat interface, so that the user can know the identity of the other party from the Bluetooth chat interface.

In addition, when the quality of a data network is poor and the second terminal is within a connection range, the first terminal automatically switches to the Bluetooth chat interface, thereby communicating with the second terminal through the Bluetooth connection. Therefore, this can avoid the impact of switching transmission modes on user experience when the quality of the data network is good while improving the communication quality.

In a possible application scenario, when the Bluetooth connection with the second terminal is broken (for example, the distance between the first terminal and the second terminal exceeds the Bluetooth connection range), the first terminal switches the Bluetooth chat interface to the instant messaging application interface, thereby allowing the user to continue communicating through the instant messaging application.

Figure 8:
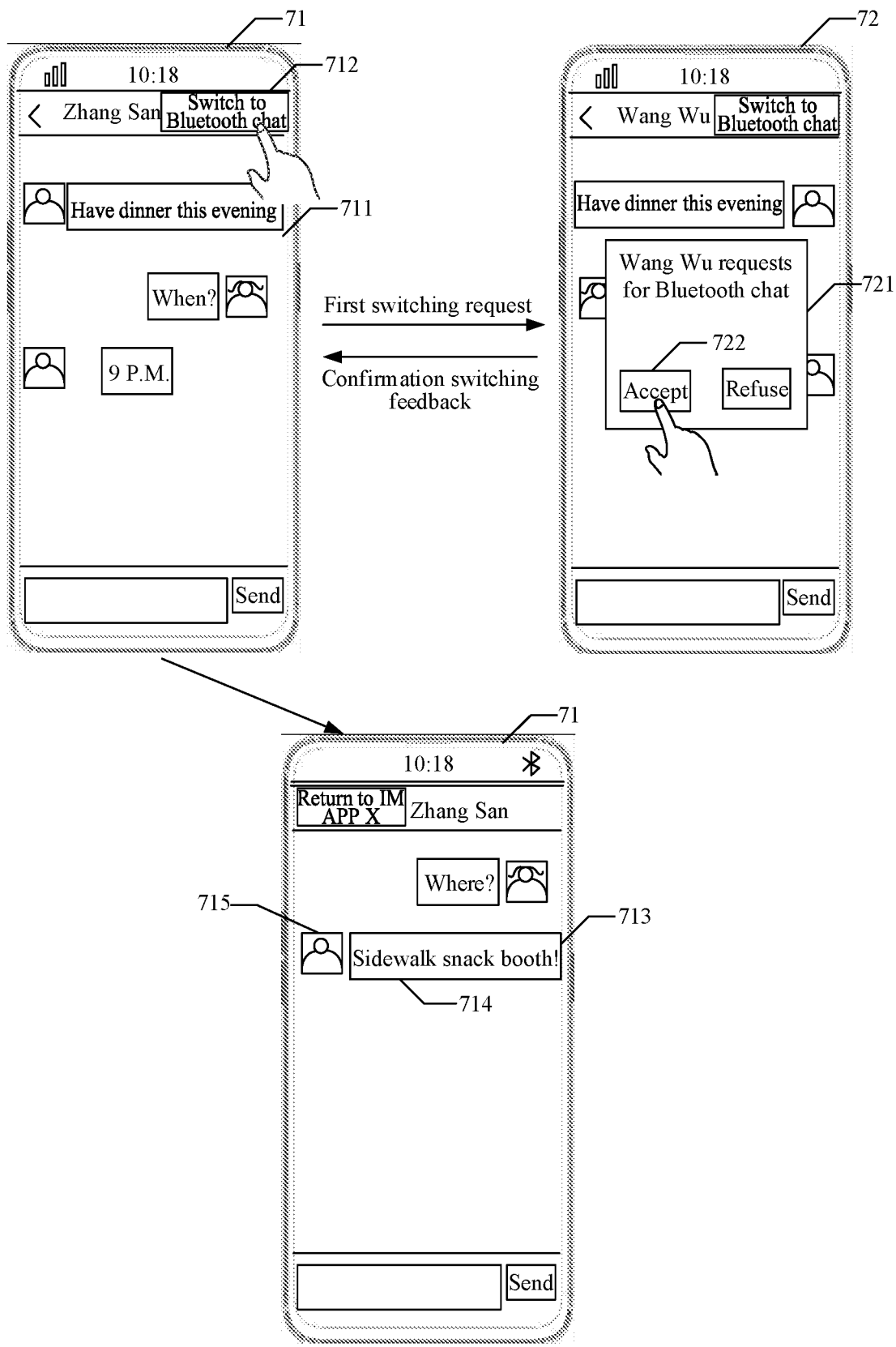
FIG. 8 is a schematic interface diagram of an implementation process of the message transmission method in FIG. 7.

In another possible implementation manner, the Bluetooth chat interface includes a switching control. The switching control is used to trigger switching from the Bluetooth chat interface back to the instant messaging application interface, so that the user manually switches back to the instant messaging application. As illustrated in FIG. 8, which is based on FIG. 6, the following operations also may be included after the operation in 606.

In 611, when a trigger signal for a switching control in the Bluetooth chat interface is received, the Bluetooth chat interface is switched to the instant messaging application interface.

Figure 9:
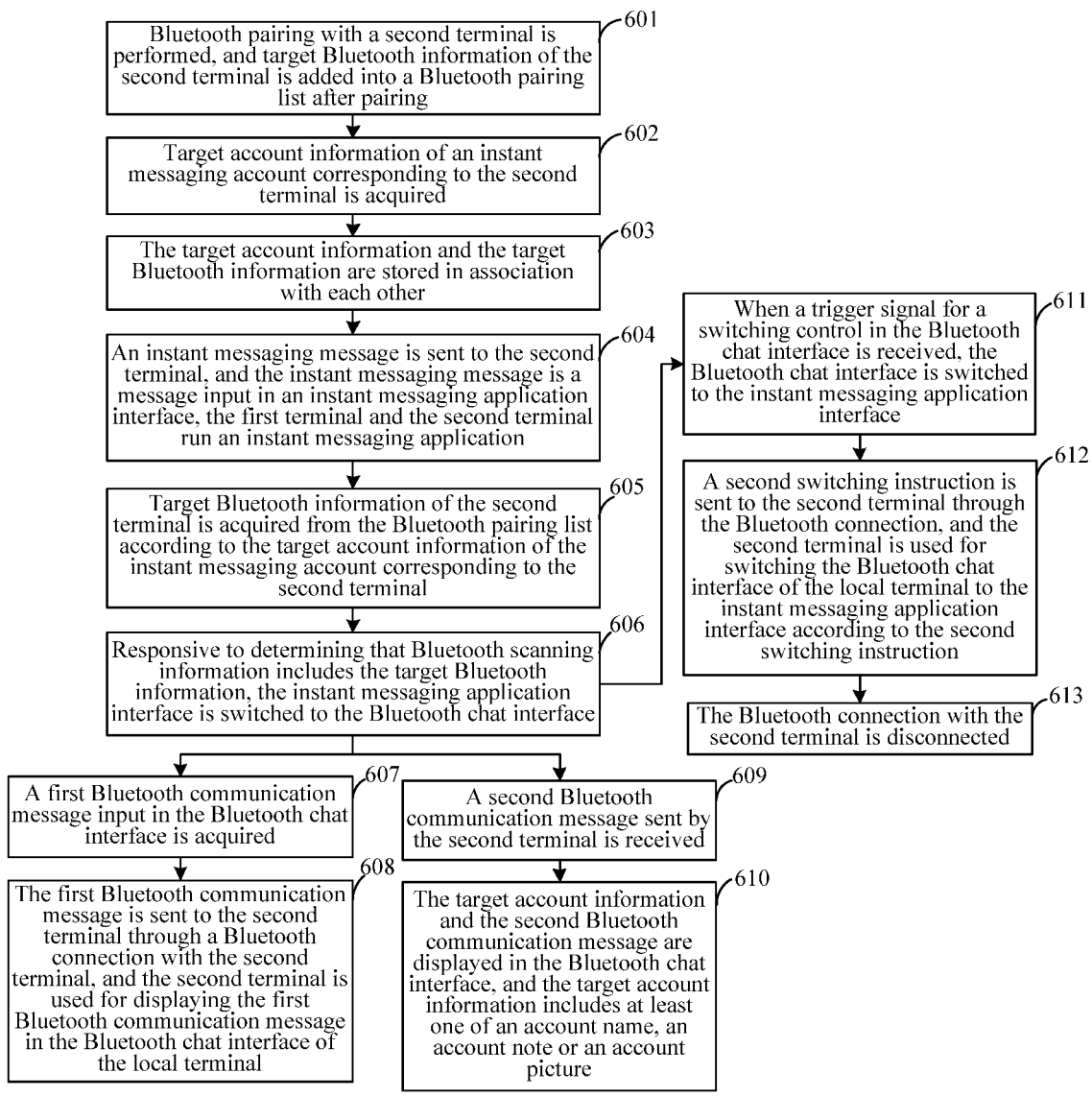
FIG. 9 illustrates a flowchart of a message transmission method according to another exemplary embodiment of the disclosure.

Schematically, as illustrated in FIG. 9, the Bluetooth chat interface 713 of the first terminal 71 displays a switching control 716. When the user clicks on the switching control 716, the first terminal 71 switches the Bluetooth chat interface 713 to the instant messaging application interface 711.

In 612, a second switching instruction is sent to the second terminal through the Bluetooth connection, and the second terminal is used for switching the Bluetooth chat interface of the local terminal to the instant messaging application interface according to the second switching instruction.

Further, the first terminal sends the second switching instruction to the second terminal via the Bluetooth connection, to instruct the second terminal to switch to the instant messaging application for chatting.

In 613, the Bluetooth connection with the second terminal is disconnected.

In at least one embodiment, after receiving a switching completion feedback sent by the second terminal, the first terminal disconnects the Bluetooth connection with the second terminal. The subsequent communication between the terminals communicate may be performed through the instant messaging application.

In other possible implementation manners, when the Bluetooth signal strength is less than the strength threshold and the network parameter of the mobile data network or the Wi-Fi network is more than the parameter threshold, the first terminal and the second terminal automatically switch to display the instant messaging application interface, which is not limited in the present embodiment.

In at least one embodiment, in order to ensure the consistency of a communication record in the instant messaging application, after the first terminal switches the Bluetooth chat interface to the instant messaging application interface, the Bluetooth chat record is imported into the instant messaging application, so that the instant messaging application displays the Bluetooth chat record in the instant messaging application interface.

In a possible implementation manner, the first terminal acquires account information of a message sender corresponding to the Bluetooth communication message in the Bluetooth chat record, so as to add the Bluetooth chat record to an instant messaging chat record corresponding to the corresponding instant messaging account according to the account information.

Schematically, as illustrated in FIG. 9, after the interface switching is completed, the first terminal 71 displays, in the instant messaging application interface 711, the Bluetooth chat record in the Bluetooth chat interface 713.

The Bluetooth chat record imported into the instant messaging application is stored locally but not uploaded to the server. Therefore, the leakage of the personal privacy can be avoided.

The operations in blocks 601-613 may also be applied in the scenarios that the message transmission is implemented by using other LPWAN technologies, such as LoRa, SigFox, Weightless, RPMA, Qowisio, N-Wave, Telensa, DART or the like. The specific implementation for the message transmission by using the other LPWAN technologies will not be elaborated herein in order to avoid repetition.

Figure 10:
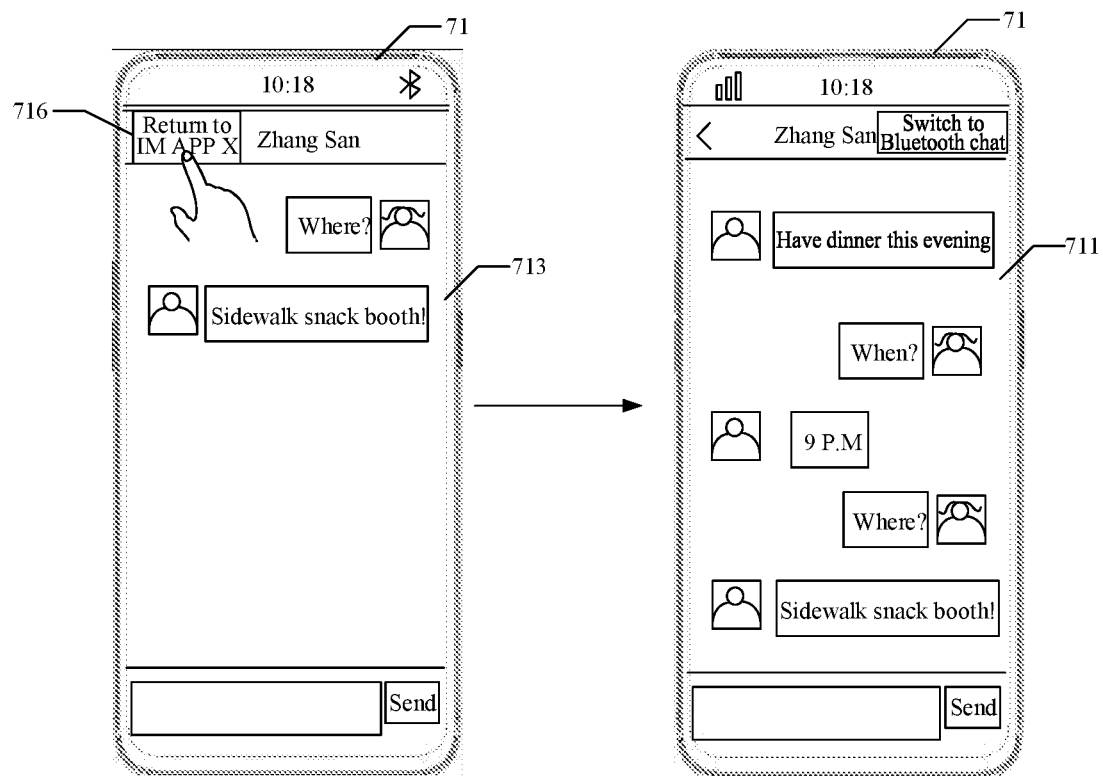
FIG. 10 is a schematic interface diagram of an implementation process of the message transmission method in FIG. 9.
Figure 11:
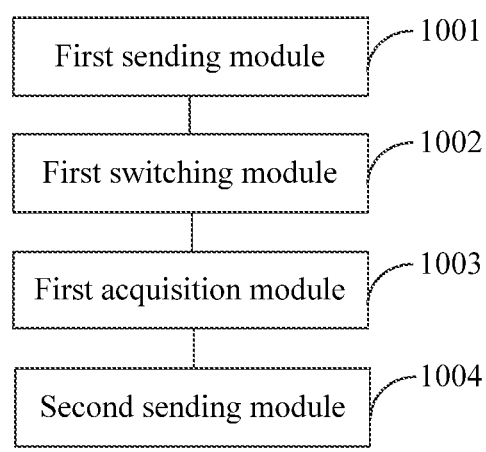
FIG. 11 illustrates a schematic structure diagram of a message transmission device according to an embodiment of the disclosure.

Referring to FIG. 10, FIG. 10 illustrates a schematic structure diagram of a message transmission device according to an embodiment of the disclosure. The message transmission device may be implemented as all or part of the first terminal 120 by software, hardware or a combination of both. The device includes a first sending module 1001, a first switching module 1002, a first acquisition module 1003, and a second sending module 1004.

The first sending module 1001 is configured to send an instant messaging message to a second terminal. The instant messaging message is a message input in a first chat interface, and the first chat interface is an interface of an instant messaging application that is being run in the first terminal and the second terminal.

The first switching module 1002 is configured to switch, responsive to determining that a transmission mode switching condition is satisfied, the first chat interface to a second chat interface. The second chat interface is used for displaying an LPWAN communication record between the first terminal and the second terminal.

The first acquisition module 1003 is configured to acquire a first LPWAN communication message input in the second chat interface.

The second sending module 1004 is configured to send the first LPWAN communication message to the second terminal through a connection with the second terminal. The second terminal is used for displaying the first LPWAN communication message in the second chat interface of the local terminal.

The second chat interface may be an LPWAN chat interface.

In at least one embodiment, the first switching module 1002 may include an information acquisition unit and a switching unit. The information acquisition unit is configured to acquire target configuration information of the second terminal from a pairing list according to target account information of an instant messaging account corresponding to the second terminal. The pairing list may include a correspondence between configuration information and account information of paired terminals, and the configuration information may include LPWAN information. The switching unit is configured to switch, responsive to determining that scanning information obtained by the first terminal includes the target configuration information, the first chat interface to the second chat interface.

In at least one embodiment, the switching unit is configured to switch, responsive to determining that the scanning information includes the target configuration information and a network parameter of a mobile data network or a Wi-Fi network is less than a parameter threshold, the first chat interface to the second chat interface.

In at least one embodiment, the switching unit is configured to send, when a switching instruction triggered by a transmission mode switching operation is received and the scanning information includes the target configuration information, a first switching request to the second terminal and switch, responsive to receiving a confirmation switching feedback sent by the second terminal, the first chat interface to the second chat interface.

In at least one embodiment, the device may further include a pairing module, a second acquisition module and a storage module. The pairing module is configured to perform pairing with the second terminal, and add the target configuration information of the second terminal into the pairing list after pairing. The second acquisition module is configured to acquire the target account information of the instant messaging account corresponding to the second terminal. The storage module is configured to store the target account information and the target configuration information in association with each other.

In at least one embodiment, the device may further include a receiving module and a display module. The receiving module is configured to receive a second LPWAN communication message sent by the second terminal. The display module is configured to display the target account information and the second LPWAN communication message in the second chat interface. The target account information includes at least one of an account name, an account note, or an account picture.

In at least one embodiment, the device may further include a second switching module or a third switching module. The second switching module is configured to switch, when the connection with the second terminal is disconnected, the second chat interface to the first chat interface. The third switching module is configured to switch, in condition that a trigger signal for a switching control in the second chat interface is received, the second chat interface to the first chat interface, send a second switching instruction to the second terminal through the connection, to enable the second terminal to switch the second chat interface of the second terminal to the first chat interface according to the second switching instruction, and disconnect the connection with the second terminal.

In at least one embodiment, the device may further include an importing module. The importing module is configured to import the chat record into the instant messaging application. The instant messaging application is used for displaying the chat record in the first chat interface.

In at least one example, the message transmission device performs message transmission by using the Bluetooth function, and the second chat interface is a Bluetooth chat interface. In such case, the first switching module 1002 includes a Bluetooth information acquisition unit and a switching unit. The Bluetooth information acquisition unit is configured to acquire target Bluetooth information of the second terminal from a Bluetooth pairing list according to target account information of an instant messaging account corresponding to the second terminal. The Bluetooth pairing list includes a correspondence between Bluetooth information and account information of paired terminals. The switching unit is configured to switch, responsive to determining that Bluetooth scanning information includes the target Bluetooth information, the instant messaging application interface to the Bluetooth chat interface.

In at least one example, the switching unit is configured to switch, responsive to determining that the Bluetooth scanning information includes the target Bluetooth information and a network parameter of a mobile data network or a Wi-Fi network is less than a parameter threshold, the instant messaging application interface to the Bluetooth chat interface.

In at least one example, the switching unit is configured to send, when a switching instruction triggered by a transmission mode switching operation is received and the Bluetooth scanning information includes the target Bluetooth information, a first switching request to the second terminal; and switch, responsive to receiving a confirmation switching feedback sent by the second terminal, the instant messaging application interface to the Bluetooth chat interface.

In at least one example, the device further includes a pairing module, a second acquisition module and a storage module. The pairing module is configured to perform Bluetooth pairing with the second terminal, and add the target Bluetooth information of the second terminal into the Bluetooth pairing list after pairing. The second acquisition module is configured to acquire the target account information of the instant messaging account corresponding to the second terminal. The storage module is configured to associatively store the target account information and the target Bluetooth information.

In at least one example, the device further includes a receiving module and a display module. The receiving module is configured to receive a second Bluetooth communication message sent by the second terminal. The display module is configured to display the target account information and the second Bluetooth communication message in the Bluetooth chat interface.

In at least one example, the device further includes a second switching module or a third switching module. The second switching module is configured to switch, when the Bluetooth connection with the second terminal is disconnected, the Bluetooth chat interface to the instant messaging application interface. The third switching module is configured to switch, when a trigger signal for a switching control in the Bluetooth chat interface is received, the Bluetooth chat interface to the instant messaging application interface, send a second switching instruction to the second terminal through the Bluetooth connection, the second terminal being used for switching the Bluetooth chat interface of the local terminal to the instant messaging application interface according to the second switching instruction, and disconnect the Bluetooth connection with the second terminal.

In at least one example, the device further includes an importing module. The importing module is configured to import the Bluetooth chat record into the instant messaging application. The instant messaging application displays the Bluetooth chat record in the instant messaging application interface.

In at least one example, the first terminal and the second terminal support a long range mode of a Bluetooth 5.0 protocol.

The above modules or units may also perform information transmission in the other public or private wireless protocol, such as the LoRa protocol. As illustrated in FIG. 6, the first switching module 1002 is further configured to switch the instant messaging application interface to the LoRa chat interface responsive to determining that a transmission mode switching condition is satisfied. In the LoRa protocol, the above modules or units may perform the same or similar operations as those in the Bluetooth protocol, which will not be elaborated herein in order to avoid repetition.

In the present embodiment of the disclosure, during the process of message transmission between terminals through an instant messaging application, when a transmission mode switching condition is satisfied, the terminal switches an instant messaging application interface to a second chat interface, and transmits a communication message input in the second chat interface of the local terminal to the opposite terminal through a connection established between the terminals, thereby implementing message transmission between the terminals. With the message transmission method according to the embodiment of the disclosure, when a network state is poor, the terminals can switch to use LPWAN technologies for message transmission, thereby avoiding the problem that communication cannot be performed when the network state is poor, and expanding an application scenario of communications between the terminals.

The embodiments of the disclosure also provide a terminal. The terminal may be the terminal illustrated in FIG. 2 and FIG. 3, and may be configured to execute operations of the first terminal corresponding to the method embodiment described above. The terminal may include a processor, a transceiver and a memory. The processor, the transceiver and the memory are communicated to each other via an internal connection path. The memory is configured to store an instruction. The processor is configured to execute the instruction stored in the memory to control the transceiver to receive or send information.

The transceiver is configured to send an instant messaging message to a second terminal. The instant messaging message is a message input in a first chat interface, and the first chat interface is an interface of an instant messaging application that is being run in the terminal and the second terminal.

The processor is configured to execute at least one instruction in the memory to switch, responsive to determining that a transmission mode switching condition is satisfied, the first chat interface to a second chat interface. The second chat interface is used for displaying an LPWAN communication record between the terminal and the second terminal.

The transceiver is further configured to acquire a first LPWAN communication message input in the second chat interface, and send the first LPWAN communication message to the second terminal through a connection with the second terminal for display of the first LPWAN communication message in the second chat interface of the second terminal.

In at least one embodiment, the second chat interface adopts a public or private wireless protocol.

In at least one embodiment, the processor is further configured to acquire target configuration information of the second terminal from a pairing list according to target account information of an instant messaging account corresponding to the second terminal, and switch, responsive to determining that scanning information obtained by the terminal includes the target configuration information, the first chat interface to the second chat interface. The Bluetooth pairing list includes a correspondence between configuration information and account information of paired terminals, and the configuration information includes LPWAN information.

In at least one embodiment, the processor is further configured to switch, responsive to determining that the scanning information includes the target configuration information and a network parameter of a mobile data network or a Wi-Fi network is less than a parameter threshold, the first chat interface to the second chat interface.

In at least one embodiment, the transceiver is further configured to send, in condition that a switching instruction triggered by a transmission mode switching operation is received and the scanning information includes the target configuration information, a first switching request to the second terminal. The processor is further configured to switch, responsive to receipt of a confirmation switching feedback sent by the second terminal, the first chat interface to the second chat interface.

In at least one embodiment, before the instant messaging message is sent to the second terminal, the processor is further configured to perform pairing with the second terminal, add the target configuration information of the second terminal into the pairing list after pairing, acquire the target account information of the instant messaging account corresponding to the second terminal, and associatively store the target account information and the target configuration information in the memory.

In at least one embodiment, the transceiver is further configured to receive a second LPWAN communication message sent by the second terminal. The processor is further configured to display the target account information and the second LPWAN communication message in the second chat interface. The target account information includes at least one of an account name, an account note, or an account picture.

In at least one embodiment, the processor is further configured to switch, in condition that the connection with the second terminal is disconnected, the second chat interface to the first chat interface.

In at least one embodiment, the processor is further configured to switch, in condition that a trigger signal for a switching control in the second chat interface is received, the second chat interface to the first chat interface. The transceiver is further configured to send a second switching instruction to the second terminal through the connection, to enable the second terminal to switch the second chat interface of the second terminal to the first chat interface according to the second switching instruction, and disconnect the connection with the second terminal.

In at least one embodiment, the processor is further configured to import the chat record into the instant messaging application. The instant messaging application is used for displaying the chat record in the first chat interface.

In at least one embodiment, the terminal and the other terminal support a long range mode of a Bluetooth 5.0 protocol in condition that the second chat interface adopts the Bluetooth protocol.

In an implementation process, each operation of the above method may be completed by an integrated logic circuit of hardware in the processor or an instruction in a software form. The operations of the method disclosed in combination with the embodiments of the disclosure may be directly embodied to be executed and completed by a hardware processor or executed and completed by a combination of hardware and software modules in the processor. The software module may be located in a mature storage medium in this field such as a RAM, a flash memory, a ROM, a Programmable ROM (PROM) or Electrically Erasable PROM (EEPROM) and a register. The storage medium is located in the memory. The processor reads information in the memory and completes the operations of the method in combination with hardware. No more detailed descriptions will be made herein to avoid repetitions.

In a specific implementation mode, the first sending module 1001 and the second sending module 1004 in the device illustrated in FIG. 10 may be implemented by the transceiver, the first switching module 1002 and the first acquisition module 1003 may be implemented by the processor.

The embodiments of the disclosure also provide a computer-readable storage medium. The computer-readable storage medium stores at least one instruction that is loaded and executed by a processor to implement the message transmission method described in each of the above embodiments.

The embodiments of the disclosure also provide a computer program product. The computer program product stores at least one instruction that is loaded and executed by a processor to implement the message transmission method described in each of the above embodiments.

Those skilled in the art may realize that in one or more of the above examples, the functions described in the embodiments of the disclosure may be implemented in hardware, software, firmware, or any combination thereof. When implemented in software, the functions may be stored in a computer-readable medium or transmitted as one or more instructions or codes on the computer-readable medium. The computer-readable medium includes a computer storage medium and a communication medium. The communication medium may include any medium that facilitates transfer of a computer program from one location to another location. The storage medium may be any available medium that can be accessed by a general computer or a dedicated computer.

The above description is only the specific embodiment of the disclosure and not intended to limit the scope of protection of the disclosure. Any variations, equivalent replacements, improvements and the like made within the spirit and principle of the disclosure shall fall within the scope of protection of the disclosure.

The invention claimed is:

1. A message transmission method, executed by a first terminal, the method comprising:
sending an instant messaging message to a second terminal, the instant messaging message being a message input in a first chat interface, wherein the first chat interface is an interface of an instant messaging application that is being run in the first terminal and the second terminal;
switching, responsive to determining that a transmission mode switching condition is satisfied, the first chat interface to a second chat interface, the second chat interface being used for displaying a Low-Power Wide-Area Network (LPWAN) communication record between the first terminal and the second terminal;
acquiring a first LPWAN communication message input in the second chat interface; and
sending the first LPWAN communication message to the second terminal through a connection with the second terminal for display of the first LPWAN communication message in the second chat interface of the second terminal,
wherein the second chat interface adopts a public or private wireless protocol,
and wherein switching, responsive to determining that the transmission mode switching condition is satisfied, the first chat interface to the second chat interface comprises:
acquiring target configuration information of the second terminal from a pairing list according to target account information of an instant messaging account corresponding to the second terminal, the pairing list comprising a correspondence between configuration information and account information of paired terminals, wherein the configuration information comprises LPWAN information; and
switching, responsive to determining that scanning information obtained by the first terminal comprises the target configuration information, the first chat interface to the second chat interface,
and wherein before sending the instant messaging message to the second terminal, the method further comprises:
performing pairing with the second terminal, and adding the target configuration information of the second terminal into the pairing list after pairing;
acquiring the target account information of the instant messaging account corresponding to the second terminal; and
storing the target account information and the target configuration information in association with each other.

2. The method of claim 1, wherein switching, responsive to determining that the scanning information obtained by the first terminal comprises the target configuration information, the first chat interface to the second chat interface comprises: switching, responsive to determining that the scanning information comprises the target configuration information and a network parameter of a mobile data network or a Wireless-Fidelity (Wi-Fi) network is less than a parameter threshold, the first chat interface to the second chat interface.

3. The method of claim 1, wherein switching, responsive to determining that the scanning information comprises the target configuration information, the first chat interface to the second chat interface comprises: sending, in condition that a switching instruction triggered by a transmission mode switching operation is received and the scanning information comprises the target configuration information, a first switching request to the second terminal; and switching, responsive to receiving a confirmation switching feedback sent by the second terminal, the first chat interface to the second chat interface.

4. The method of claim 1, wherein after switching the first chat interface to the second chat interface, the method further comprises:
receiving a second LPWAN communication message sent by the second terminal; and
displaying the target account information and the second LPWAN communication message in the second chat interface, the target account information comprising at least one of an account name, an account note, or an account picture.

5. The method of claim 1, wherein after switching the first chat interface to the second chat interface, the method further comprises:
switching, in condition that the connection with the second terminal is disconnected, the second chat interface to the first chat interface;
or, switching, in condition that a trigger signal for a switching control in the second chat interface is received, the second chat interface to the first chat interface;
sending a second switching instruction to the second terminal through the connection, to enable the second terminal to switch the second chat interface of the second terminal to the first chat interface according to the second switching instruction; and
disconnecting the connection with the second terminal.

6. The method of claim 5, wherein after switching the second chat interface to the first chat interface, the method further comprises:
importing the chat record into the instant messaging application, the instant messaging application being used for displaying the chat record in the first chat interface.

7. A terminal, being a first terminal and comprising a processor, a transceiver and a memory, wherein
the transceiver is configured to send an instant messaging message to a second terminal, the instant messaging message being a message input in a first chat interface, wherein the first chat interface is an interface of an instant messaging appcation a is being run in the terminal and the second terminal;
the processor is configured to execute at least one instruction in the memory to switch, responsive to determining that a transmission mode switching condition is satisfied, the first chat interface to a second chat interface, the second chat interface being used for displaying a Low-Power Wide-Area Network (LPWAN) communication record between the terminal and the second terminal; and
the transceiver is further configured to acquire a first LPWAN communication message input in the second chat interface, and send the first LPWAN communication message to the second terminal through a connection with the second terminal for display of the first LPWAN communication message in the second chat interface of the second terminal,
wherein the second chat interface adopts a public or private wireless protocol,
and wherein the processor is further configured to:
acquire target configuration information of the second terminal from a pairing list according to target account information of an instant messaging account corresponding to the second terminal, the pairing list comprising a correspondence between configuration information and account information of paired terminals, wherein the configuration information comprises LPWAN information; and
switch, responsive to determining that scanning information obtained by the terminal comprises the target configuration information, the first chat interface to the second chat interface,
and wherein before the operation of sending the instant messaging message to the second terminal, the processor is further configured to:
perform pairing with the second terminal, and add the target configuration information of the second terminal into the pairing list after pairing;
acquire the target account information of the instant messaging account corresponding to the second terminal; and
associatively store the target account Information and the target configuration information in the memory.

8. The terminal of claim 7, wherein the processor is further configured to: switch, responsive to determining that the scanning information comprises the target configuration information and a network parameter of a mobile data network or a Wireless-Fidelity (Wi-Fi) network is less than a parameter threshold, the first chat interface to the second chat interface.

9. The terminal of claim 7, wherein the transceiver is further configured to send, in condition that a switching instruction triggered by a transmission mode switching operation is received and the scanning information comprises the target configuration information, a first switching request to the second terminal; and the processor is further configured to switch, responsive to receipt of a confirmation switching feedback sent by the second terminal, the first chat interface to the second chat interface.

10. The terminal of claim 7, wherein
the transceiver is further configured to receive a second LPWAN communication message sent by the second terminal; and
the processor is further configured to display the target account information and the second LPWAN communication message in the second chat interface, the target account information comprising at least one of an account name, an account note, or an account picture.

11. The terminal of claim 7, wherein the processor is further configured to switch, in condition that the connection with the second terminal is disconnected, the second chat interface to the first chat interface; or
the processor is further configured to switch, in condition that a trigger signal for a switching control in the second chat interface is received, the second chat interface to the first chat interface, and the transceiver is further configured to send a second switching instruction to the second terminal through the connection, to enable the second terminal to switch the second chat interface of the second terminal to the first chat interface according to the second switching instruction, and disconnect the connection with the second terminal.

12. The terminal of claim 11, wherein the processor is further configured to:
import the chat record into the instant messaging application, the instant messaging application being used for displaying the chat record in the first chat interface.

13. The terminal of claim 7, wherein the terminal and the second terminal support a long range mode of a Bluetooth 5.0 protocol in condition that the second chat interface adopts the Bluetooth protocol.

14. A non-transitory computer-readable storage medium, storing at least one instruction that is executed by a processor of a first terminal to implement a message transmission method, the method comprising:
sending an instant messaging message to a second terminal, the instant messaging message being a message input in a first chat interface, wherein the first chat interface is an interface of an instant messaging application that is being run in the first terminal and the second terminal;
switching, responsive to determining that a transmission mode switching condition is satisfied, the first chat interface to a second chat interface, the second chat interface being used for displaying a Low-Power Wide-Area Network (LPWAN) communication record between the first terminal and the second terminal;
acquiring a first LPWAN communication message input in the second chat interface; and
sending the first LPWAN communication message to the second terminal through a connection with the second terminal for display of the first LPWAN communication message in the second chat interface of the second terminal, wherein the second chat interface adopts a public or private wireless protocol, and wherein switching, responsive to determining that the transmission mode switching condition is satisfied, the first chat interface to the second chat interface comprises:

acquiring target configuration information of the second terminal from a pairing list according to target account information of an instant messaging account corresponding to the second terminal, the pairing list comprising a correspondence between configuration information and account information of paired terminals, wherein the configuration information comprises LPWAN information; and switching, responsive to determining that scanning information obtained by the first terminal comprises the target configuration information, the first chat interface to the second chat interface, and wherein before sending the instant messaging message to the second terminal, the method further comprises:

performing pairing with the second terminal, and adding the target configuration information of the second terminal into the pairing list after pairing;

acquiring the target account information of the instant messaging account corresponding to the second terminal; and storing the target account information and the target configuration information in association with each other.

* * * * *